United States Patent
Heckt et al.

(10) Patent No.: US 11,047,383 B2
(45) Date of Patent: Jun. 29, 2021

(54) CONTROL FLOWRATE REGULATING VALVE SPECIFICALLY FOR SCROLL COMPRESSOR INSIDE VEHICLE AIR CONDITIONER OR HEAT PUMP

(71) Applicant: Hanon Systems, Daejeon (KR)

(72) Inventors: Roman Heckt, Aachen (DE); Philipp Kozalla, Cologne (DE); Laura Arriazu, Pulheim (DE); Bernd Vierkotten, Cologne (DE)

(73) Assignee: Hanon Systems, Daejeon (KR)

( * ) Notice: Subject to any disclaimer, the term of this patent is extended or adjusted under 35 U.S.C. 154(b) by 121 days.

(21) Appl. No.: 15/780,173

(22) PCT Filed: Mar. 21, 2017

(86) PCT No.: PCT/KR2017/003035
§ 371 (c)(1),
(2) Date: May 30, 2018

(87) PCT Pub. No.: WO2017/164628
PCT Pub. Date: Sep. 28, 2017

(65) Prior Publication Data
US 2019/0040860 A1 Feb. 7, 2019

(30) Foreign Application Priority Data
Mar. 22, 2016 (DE) .......................... 102016105302.3

(51) Int. Cl.
*F04C 28/12* (2006.01)
*F04C 28/24* (2006.01)
(Continued)

(52) U.S. Cl.
CPC ........ *F04C 18/0215* (2013.01); *F04C 27/005* (2013.01); *F04C 28/18* (2013.01);
(Continued)

(58) Field of Classification Search
CPC ...... F16K 15/025; F04C 27/005; F04C 29/12; F04C 28/18; F04C 28/12; F04C 28/26;
(Continued)

(56) References Cited

U.S. PATENT DOCUMENTS 5,240,388 A * 8/1993 Matsumoto ............. F04C 28/12
417/299
5,451,146 A * 9/1995 Inagaki .................. F04C 28/125
417/308
(Continued)

FOREIGN PATENT DOCUMENTS

DE 102013021250 A1 6/2015
EP 0486122 A1 5/1992
(Continued)

OTHER PUBLICATIONS

International Search Report issued in PCT/KR2017/003035 dated Jun. 27, 2017.

*Primary Examiner* — Deming Wan
(74) *Attorney, Agent, or Firm* — Norton Rose Fulbright US LLP; James R. Crawford (57) ABSTRACT

Control flowrate regulating valve for a scroll compressor inside a vehicle air conditioner or a heat pump, the valve at least comprising: a housing; a closing member; and fluid connection parts for a control flowrate of back pressure, high pressure and suction pressure. Fluid connection parts having effective areas, of the closing member, assigned to the fluid connection parts. Control flowrate regulating valve has a fluid connection part, for peripheral pressure, and an effective area of the closing member. It is formed in a fluid-sealing manner for other chambers having high pressure, back pressure and suction pressure, such that the force, obtained from the pressures applied to the closing member, is applied to the closing member to allow the control flowrate, which moves from the high pressure to the suction (Continued)

pressure, to flow in a manner of forming the back pressure. Peripheral pressure is applied to the closing member.

14 Claims, 6 Drawing Sheets

(51) Int. Cl.

| | | |
|---|---|---|
| *F04C 29/00* | (2006.01) | |
| *F04C 18/02* | (2006.01) | |
| *F04C 23/00* | (2006.01) | |
| *F04C 28/26* | (2006.01) | |
| *F16K 15/02* | (2006.01) | |
| *F04C 27/00* | (2006.01) | |
| *F04C 28/18* | (2006.01) | |
| *F04C 29/12* | (2006.01) | |
| *G05D 7/01* | (2006.01) | |

(52) U.S. Cl.
CPC ............ *F04C 29/12* (2013.01); *F16K 15/025* (2013.01); *G05D 7/0126* (2013.01); *F04C 2210/261* (2013.01)

(58) Field of Classification Search
CPC ............ F04C 18/0215; F04C 18/0261; G05D 7/0126
See application file for complete search history.

(56) References Cited

U.S. PATENT DOCUMENTS

| | | | | |
|---|---|---|---|---|
| 5,885,063 | A | * | 3/1999 | Makino ................ F04C 28/12 |
| | | | | 417/310 |
| 5,979,496 | A | * | 11/1999 | Markham ................ F17C 7/00 |
| | | | | 137/505 |
| 6,299,417 | B1 | | 10/2001 | Shin et al. |
| 2002/0020186 | A1 | * | 2/2002 | Morozumi ............ F04C 23/008 |
| | | | | 62/324.5 |
| 2004/0253133 | A1 | * | 12/2004 | Gennami ............ F04C 18/0215 |
| | | | | 418/55.1 |
| 2006/0057010 | A1 | | 3/2006 | Tsubono et al. |
| 2010/0158710 | A1 | | 6/2010 | Umemura et al. |
| 2010/0209819 | A1 | | 8/2010 | Fukuma et al. |
| 2014/0348681 | A1 | | 11/2014 | Obrist et al. |

FOREIGN PATENT DOCUMENTS

| | | |
|---|---|---|
| JP | H06147148 A | 5/1994 |
| JP | H10184568 A | 7/1998 |
| KR | 20100016916 A | 2/2010 |
| KR | 20120080275 A | 7/2012 |
| KR | 20140114208 A | 9/2014 |
| KR | 101467024 B1 | 12/2014 |
| KR | 101509290 B1 | 4/2015 |

* cited by examiner

CONTROL FLOWRATE REGULATING VALVE SPECIFICALLY FOR SCROLL COMPRESSOR INSIDE VEHICLE AIR CONDITIONER OR HEAT PUMP

This application is a § 371 of PCT/KR2017/003035 filed on Mar. 21, 2017, which claims priority from DE 10 2016 105 302.3 filed Mar. 22, 2016.

TECHNICAL FIELD

The present invention relates generally to a fluid flow control valve, in which case the valve includes a plurality of fluid connections for one or more fluids at different pressure levels.

BACKGROUND ART

The application field of the present invention relates particularly to an electrical and mechanical refrigerant compressor with the compression principle of a scroll compressor.

The scroll compressor includes a fixed scroll and an orbiting scroll. In this case, the fixed scroll is securely fixed in the compressor, and the orbiting scroll orbits, namely rotates with a mechanically predetermined radius in the fixed scroll. The movement of the orbiting scroll allows paired chambers to be formed between halves of two scrolls by, and the volumes of the chambers are reduced by inward movement. For this reason, internal gas is compressed in the chambers. The rise of pressure in the parallel chambers causes the force acting on the orbiting scroll, which may lead to opening at axial sealing points. In addition, the axial force acting on the orbiting scroll is not applied to the center of the orbiting scroll, thereby allowing a tilting moment to additionally separate the orbiting scroll from one side of the fixed scroll, which is referred to as overturning torque.

In the related art, there are two methods of setting a corresponding counter pressure in reverse in these two forces above all else. On the one hand, there is provided a scroll compressor having orbiting axial bearings and, on the other hand, the forces are compensated, or even overcompensated in the pressure chamber behind the orbiting scroll by the corresponding counter pressure, namely the so-called back pressure. To ensure secure operation of the scrolls under all operating conditions, it must be ensured for all conditions that the force arising from the back pressure dominates the equilibrium of forces to the orbiting scroll. Otherwise, the scrolls may open axial sealing surfaces thereof and may adjust compression of gas in extreme cases. The essential back pressure varies depending on the applied pressures, internal tightness, and additional parameters. On the other hand, a too high counter pressure in the equilibrium of forces to the orbiting scroll causes excessive friction and wear of components.

In the related art, the back pressure is formed by a nozzle system in response to high pressure and suction pressure. To this end, two nozzles having flow losses interact with each other so that an appropriate intermediate pressure, namely back pressure is set in all cases.

Alternatively, according to, for example, US 2010/0158710 A1 in the related art, back pressure is supplied to a back-pressure chamber or is formed at the discharge side from the back-pressure chamber by a spring-loaded mechanical control valve.

In a further variant of the related art, there are combinations of nozzles and a pressure-controlled on/off valve at the discharge side from back-pressure chambers. However, this valve is primarily useful for start-up. Accordingly, it is ensured that back pressure is formed from the beginning.

According to the related art, back pressure is, in all cases, formed by a so-called control flow from high pressure (Pd) via a back-pressure chamber to suction pressure (Ps). This control flow means a loss of operation in a compressor because the compressor transfers pre-compressed gas to the suction side again and negatively affects the volumetric and isentropic efficiency of the machine. Furthermore, the control mass flow also means an enthalpy flow. The control mass flow is mixed with suction gas introduced in front of a suction-side scroll unit where it causes a reduction in density and an increase in temperature of the suction gas. This negatively affects the volumetric operation method of the compressor again.

In the related art, oil recirculation is typically realized by the control flow in the compressor. Accordingly, the material flow of the control flow is a two-phase flow with very variable components of oil and gaseous refrigerant. This rapid variation is proved from the fact that the size of the control volume flow for operating pressure of the compressor depends on only two applied pressures. Besides, the amount of oil separated from the high-pressure side depends on the discharge mass flow of the compressor and thus the rotational speed thereof. The result obtained from this fact is that the oil/gas ratio of the control flow varies rapidly depending on the rotational speed. In addition, this result is also associated with a variation in viscosity and density of the control flow in an upper control nozzle opposite to a lower control nozzle. In an embodiment with two nozzles or nozzles with suction-side check valves, it is necessary to exceed the required back pressure in order to securely ensure operation with a sufficient back pressure in all variations. This necessary excess of pressure causes additional friction between the halves of the scrolls by a corresponding negative influence on efficiency and a risk of wear pieces or an overload of friction system. Furthermore, in the embodiment according to the related art, the secure operation requires a control channel to have a minimal cross-section due to the variation of the oil/gas ratio, in which case the minimal cross-section in the control channel prevent optimization in terms of maximum efficiency. Another disadvantage of the embodiment with two nozzles or nozzles with suction-side check valves is feasibility in an electrical refrigerant compressor including R744 as a refrigerant. Due to relatively higher pressure and relatively higher density associated with the pressure, very small flow cross-sections must be realized in the application of the control flow. However, these cross-sections cause high costs in continuous production and failure due to variations. In addition, these variations require filters, the cross-sections of which are not adjusted, to prevent the malfunction of the nozzles in case of contamination, in which case the contamination represents a high risk of completely blocking the filters in operation for several years. Accordingly, in R744 as a refrigerant, the solution with two nozzles or nozzle with suction-side check valves is not suitable for all or is only suitable for limited continuous production, and is not very robust. A further disadvantage relating to the principle of the related art with two nozzles or nozzle with suction-side check valves is an insufficient readjustment function over life. This arises from the fact that the seals of the back-pressure chamber to suction pressure, such as stem seals or orbiting seals, are reduced in strength during the life of the compressor. Since the above-mentioned solution has no possibility of readjustment in the present invention, this risk has to be considered as an additional reserve in the design of nozzles and causes an additional excess of back pressure required from the beginning together with the disadvantages described in regard to efficiency and friction engineering.

The partial solution of these disadvantages is disclosed in US 2010/0158710 A1 including an active spring-loaded pressure regulation device. This solution addresses the above problem relating to leakage over life and influences on different compositions of gas and oil in control channels. In the method of operation, this regulation device regulates back pressure according to a pressure difference between high pressure and suction pressure in inflow or outflow into or from a back-pressure chamber. For example, it should be noted that pressures, such as high pressure, suction pressure, and back pressure, i.e. counter pressure, are measured only relative to each other, resulting in various disadvantages. As a result, especially when R744 as a refrigerant is used for operation, a control valve is functionally limited such that it is operated in a cooling device mode or a heat pump mode. An alternate method of operation is technically impossible or is associated with other disadvantages.

Figure 6:
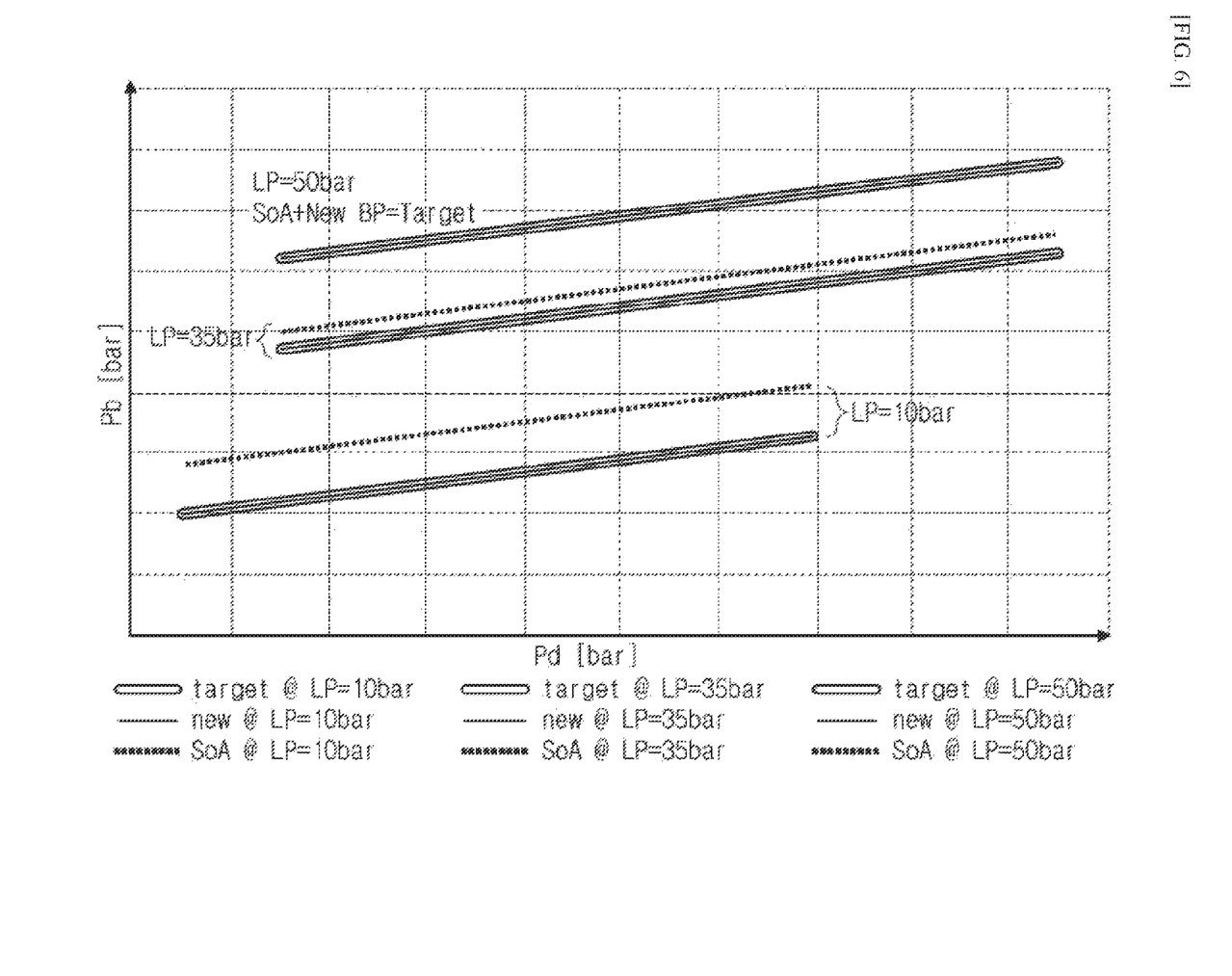
FIG. 6 is a diagram illustrating counter pressure according to high pressure as a comparison of pressure ratio between US 2010/0158710 A1 and the present invention.

In an electrical refrigerant compressor, which is used to operate a heat pump for heating as well as operating points for air conditioning and/or is used for a compressor for refrigerant R744, the above solution is disadvantageous in that the required back pressure of a scroll compressor functions as an absolute suction pressure as well as a pressure difference between high pressure (Pd) and suction pressure (Ps). In order for the electrical refrigerant compressor for R744 to be used in the total operating range, it is disadvantageous that the required back pressure essentially exceeds at least about 8 bar. Here, the suction-side operating region of the electrical R744 refrigerant compressor is set from 10 bar via 35 bar to 50 bar on the basis of the suction side. This relationship is illustrated in FIG. 6. In the follow-up to US 2010/0158710 A1, it is illustrated that the dotted line is maintained as a function curve whereas the target pressure curve and the pressure curve according to the implementation of the concept of the present invention overlap with each other by thick lines. According to the present invention and US 2010/0158710 A1, the function curve and the target pressure curve overlap with each other only at 50 bar. The variation increases when pressure decreases, and for this reason, there is an excess of 8 bar for counter pressure at 10 bar, resulting in the negative consequences mentioned above.

DISCLOSURE

Technical Problem

Accordingly, an object of the present invention is to minimize a control flow by a control flow control valve. In addition, another object of the present invention is to provide a control unit that is also suitable for R744 as a refrigerant.

Technical Solution

These objects of the present invention are resolved in particular by a subject having features according to claim 1. Improvements are specified in dependent claims.

The objects of the present invention are resolved in particular by a control flow control valve. Preferably, the control flow control valve may be used for a scroll compressor in a vehicle air conditioner or heat pump. The control flow control valve includes at least a housing (8), a closure member disposed in the housing, and fluid connections for a control flow of counter pressure (Pb), high pressure (Pd) and suction pressure (Ps). The fluid connections define chambers having a corresponding pressure level and lead to effective areas of the closure member assigned thereto. In the aspect of the present invention, the effective areas mean areas of the closure member of the control flow control valve, in which case the respective pressures applied through the areas of the closure member act on the closure member as a predetermined force. The force acting on the closure member is determined by the size and arrangement of effective areas and the pressure levels of individual pressure chambers. In addition, the present invention further includes a fluid connection for ambient pressure (ATM) having an effective area of the closure member assigned to the fluid connections for high pressure, counter pressure, and suction pressure. The resultant force acting on the closure member is caused by the pressures (Pd, Pb, Ps, ATM) applied to the closure member. As a result, the closure member of the valve is open for the control flow, and the control flow is formed from the high pressure (Pd) to the suction pressure (Ps) in a way to form the counter pressure (Pb). In this case, the ambient pressure (ATM) in the valve is formed in a fluid-sealing manner to other chambers having high pressure (Pd), counter pressure (Pb), and suction pressure (Ps) and acting on the closure member. The formation of the ambient-pressure connection in the fluid-sealing manner means that, of course, the fluid system forming the control flow is effective and securely separated from the ambient pressure. This is necessary for example in the application of the control flow control valve in refrigerant systems, and a refrigerant circulation system is securely and materially separated from the ambient pressure and is used for regulation of the control flow and particularly for determining pressures relative to the ambient pressure.

According to a preferred embodiment of the present invention, a spring member is disposed in or on the control flow control valve to generate an additional force (FO) against the closure member. In this case, the spring member as a spring is formed as a spiral spring or a leaf spring in a conventional sense or is formed of an elastic material having spring properties in a broad sense.

Preferably, the spring force of the spring member is adjusted and designed in magnitude such that the closure member is always open to the fixed pressure difference between the high pressure and the suction pressure to pass a fluid flow as the control flow therethrough at the position of the control flow control valve between the high pressure and the counter pressure. The spring force of the spring member allows the closure member to be securely closed to the fixed pressure difference between the high pressure and the suction pressure to prevent the pass of a fluid flow as the control flow therethrough at the position of the control flow control valve between the counter pressure and the suction pressure.

Particularly, in the preferred structural embodiment of the present invention, the closure member is formed in several parts by a plurality of closure member segments.

In order to materially and securely separate the fluid system in the control flow from ambient environment and prevent leakage, the closure member is sealed in a fluid-sealing manner to the ambient pressure (ATM) by a welded sheet membrane or a vulcanized membrane.

Preferably, the closure member has a cylindrical stepped shape and is formed in three parts by three closure member segments. This is associated with particular advantages in terms of manufacturing and assembling the valve. In particular, when the closure member consisting of the plurality of parts is designed as an interference-fit assembly, the closure member segments of the closure member are interconnected only by forces acting on the closure member segments without an additional connecting means. This design minimizes problems relating to the design of a means for connecting individual components and problems relating to the durability and dimensional precision of the interference-fit assembly associated with the above problems. The interference-fit assembly is characterized in that the individual segments are coupled to each other only by forces acting thereon without an additional connecting means between the segments. At the same time, the closure member may consist of closure member segments without the need for an additional auxiliary means in a manner that the closure members are placed side by side during assembly.

According to a preferred embodiment of the present invention, the closure member includes two segments, i.e. a primary valve stem and a secondary valve stem, and the valve stems are interconnected by a lever mechanism.

Preferably, the closure member has a stroke of maximum 0.2 mm, particularly in use for refrigerant circulation systems.

To ensure the function of the valve, a stopper for the stroke of the closure member, as a maximum stroke limitation device, is formed in the housing of the control flow control valve or is formed in the scroll compressor by the fitting position of the control flow control valve.

Preferably, the ambient-pressure fluid connection is formed as a recess in the housing. The fluid connection is designed to be protected from water by a membrane for preventing the pass of water therethrough, in order to prevent accumulation of water or moisture in the closure member and a risk of corrosion associated therewith.

Figure 2:
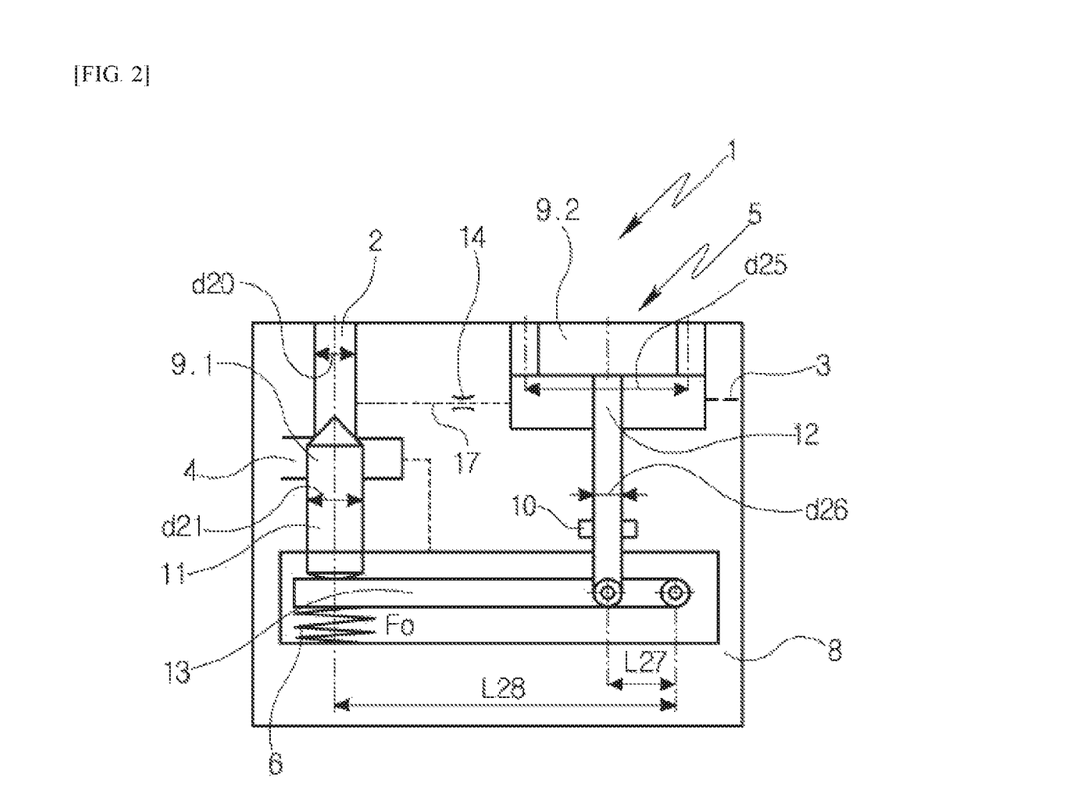
FIG. 2 is a basic circuit diagram of a control flow control valve including a closure member consisting of two parts and a lever mechanism.
Figure 3:
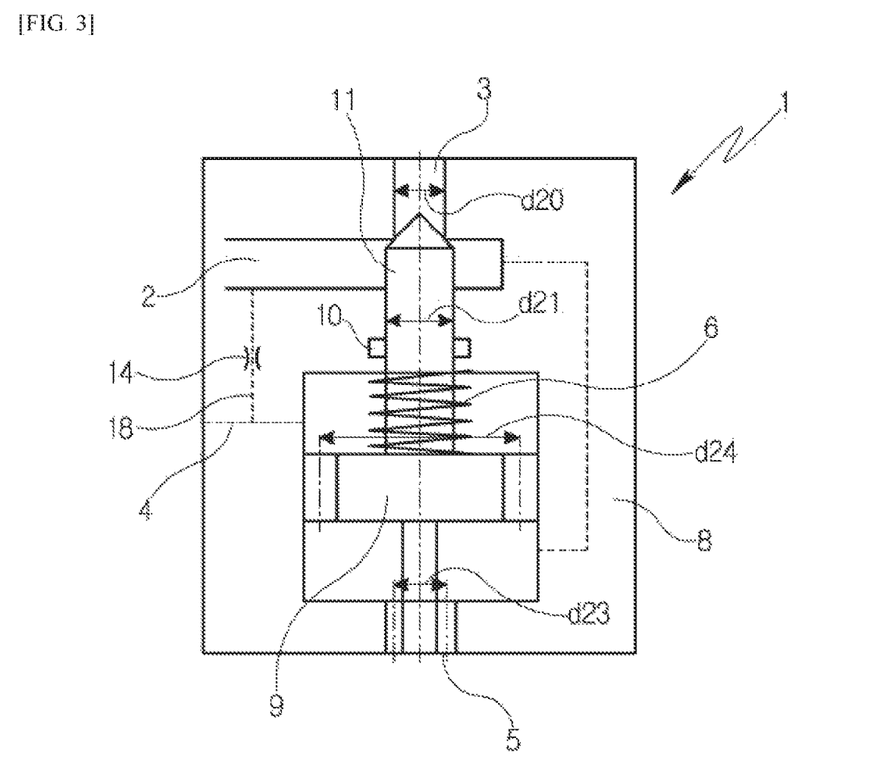
FIG. 3 is a basic circuit diagram of a control flow control valve with an axial ambient-pressure inflow.

According to a preferred embodiment of the present invention, the ambient-pressure fluid connection is formed as a membrane in a manner that it is formed integrally with the external contour of the housing of the control flow control valve. The membrane is functionally and directly connected to the closure member on the inner side thereof, and forms a portion of an outer wall on the inner side thereof. Thus, the membrane forms a portion of the external contour of the housing. These embodiments are illustrated in FIGS. 2 and 3.

The control flow control valve is formed integrally with the scroll compressor. Preferably, the control flow control valve is directly installed in the scroll compressor. Accordingly, since the control flow control valve is designed in the compressor, it does not form a separate independent component any more. Preferably, this design increases the functionality and safety of the component and reduces an installation area.

The control flow control valve is positioned in a supply or discharge control line for a counter-pressure chamber in the scroll compressor. At the same time, the control flow control valve is disposed in the supply control line between the high pressure (Pd) and the counter pressure (Pb) or is disposed in the discharge control line between the counter pressure and the suction pressure.

Preferably, when the control flow control valve is disposed in the supply control line, a throttle is disposed in the discharge control line in a complementary manner. On the contrary, when the control flow control valve is disposed in the discharge control line, the throttle is disposed in the supply control line.

For the functional safety of the control flow control valve and the scroll valve, a filter is disposed in front of the control flow control valve in the control flow. Through such a configuration, it is possible to minimize control flow failure or functional damage due to solid particles in the fluid system of the control flow.

A particular advantage of the control flow control valve according to the present invention is that the electrical refrigerant compressor including the control flow control valve can be used similar to that using the refrigerant R744 since the optimum back pressure for the scroll compressor can be regulated as in all expectable cases. In this case, it is particularly advantageous in that the electrically-driven scroll compressor can also be used in the heat pump circuit of the R744 refrigerant circulation system. In this case, the optimum back pressure exceeds the pressure required for a constant safety margin, thereby enabling the reliable operation and long life of the compressor to be realized. Another advantage of the control flow control valve is that the control flow control valve is to respond to a change of the refrigerant compressor during the life of the component and autonomously adjust its control behavior when the pressure ratio is changed. In this regard, an automatic readjustment function can be performed without the need for additional control treatment.

Compared to the solutions according to the related art, it is advantageous in that a lower mass flow as the control flow is formed by virtue of a relatively smaller excess of counter pressure according to the present invention, resulting in improvement of process efficiency.

BRIEF DESCRIPTION OF DRAWINGS

The above and other objects, features and other advantages of the present invention will be more clearly understood from the following detailed description taken in conjunction with the accompanying drawings, in which.

BEST MODE FOR INVENTION

Figure 1:
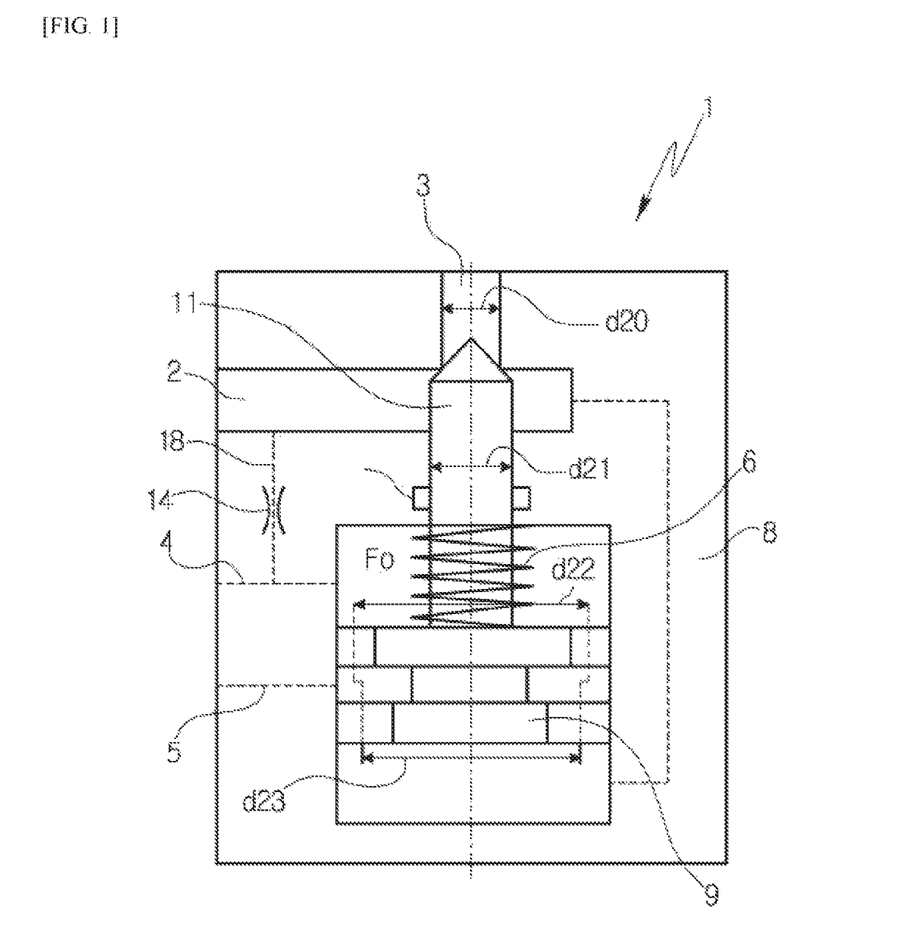
FIG. 1 is a basic circuit diagram of a control flow control valve with a radial ambient-pressure inflow.

FIG. 1 illustrates a basic circuit diagram of a control flow control valve 1 with an axial ambient-pressure inflow. The control flow control valve 1 basically includes a housing 8, and a closure member 9 is disposed in the housing for translational movement. The control flow control valve 1 includes different connections 2, 3, 4, and 5. A flow path, which is adjustable by the closure member 9, is connected through the control flow control valve 1. In the illustrated embodiment, the control flow from a high-pressure fluid connection 3 to a counter-pressure fluid connection 2 is regulated by the closure member 9. In addition, a suction-pressure fluid connection 4 and an ambient-pressure fluid connection 5 are designed in the control flow control valve 1, in which case the suction-pressure and ambient-pressure fluid connections do not define a flow path. Only pressure levels of suction pressure Ps and ambient pressure ATM are transferred to the effective areas of the closure member 9 through the fluid connections. In the closure member 9, a spring 6 acts as a spring force FO against the closure member 9 in a direction opposite to the closed position. A primary valve stem 11 of the closure member 9 interacts with the high-pressure fluid connection 3 together with a seal seat formed at the upper end of the closure member. The closure member 9 is structurally designed such that a primary valve stem diameter D21, a seal seat diameter D20, an effective diameter of Ps to ATM D22, and an effective diameter of Pb to ATM D23 are selected in a manner that the force obtained by the applied pressure acts on the closure member 9 and the control flow from the high-pressure fluid connection 3 to the counter-pressure fluid connection 2 is thus controlled. According to the illustrated embodiment, the control flow control valve 1 includes a fluid connection (indicated by the dotted line) from the counter-pressure fluid connection 2 to a chamber having an effective area for the effective diameter of Pb to ATM D23, in order to correspondently transfer the counter pressure to the equilibrium of forces of the closure member 9. Furthermore, FIG. 1 illustrates a connection line as a discharge control line 18, which is connected to the suction-pressure fluid connection 4, and a throttle 14 disposed in the control line.

FIG. 2 illustrates a control flow control valve as an embodiment in which a closure member consisting of two parts 9.1 and 9.2 is connected to a lever mechanism 13 to regulate a control flow from a counter-pressure fluid connection 2 to a suction-pressure fluid connection 4. The closure member 9.1 includes a primary valve stem 11 having a primary valve stem diameter D21, and the primary valve stem diameter is associated with a seal seat diameter D20. The primary valve stem 11 is connected to a secondary valve stem 12 and a secondary valve stem diameter D26 through the lever mechanism 13. In this case, a spring 6 acts as a spring force FO against the counter pressure Pb of the counter-pressure fluid connection 2 at the illustrated fitting position of the control flow control valve 1. A high-pressure fluid connection 3 acts on the closure member segment 9.2 over an effective diameter of Pb to ATM D25, and the closure member segment 9.2 is inserted into a housing 8 of the control flow control valve 1 via a membrane, which is not illustrated in detail, from the outside. The ambient pressure ATM acts on the secondary valve stem 12 by the pressure acting on the membrane as an ambient-pressure fluid connection 5. In this case, the secondary valve stem 12 has a secondary valve stem diameter D26 and is sealed to the suction-pressure level of the suction-pressure fluid connection 4 by a sealing ring 10. The lever mechanism 13 is configured as a connection of the primary valve stem 11 and the secondary valve stem 12 by a short lever 27 and a long lever 28.

The fitting position of the control flow control valve 1 is indicated by connecting a supply control line 17 between the counter-pressure level Pb and the high-pressure level Pd and the broken line of a throttle 14 disposed in the supply control line.

FIG. 3 illustrates a basic circuit diagram of a control flow control valve with an axial ambient-pressure inflow in regard to a closure member 9. The closure member 9 adjusts a flow path of fluid flowing from a high-pressure connection 3 to a counter-pressure fluid connection 2. Similar to that illustrated in FIG. 1, a seal seat diameter D20 is formed to be closed by a primary valve stem 11 having a primary valve stem diameter D21, in which case a spring 6 is disposed to act on the closure member 9, having an effective diameter of Ps to Pb D24, as a spring force FO. The counter pressure Pb of a counter-pressure fluid connection 2, as a counterforce, acts on the other effective diameter D24 as indicated by the dotted line, and is formed along the external contour of a housing 8 of the control flow control valve 1 to be supported by an ambient-pressure fluid connection 5 acting on the closure member 9. The connection of the counter pressure Pb and the suction pressure Ps is illustrated through a discharge control line 18 and a throttle 14, similar to FIG. 1. In particular, according to the embodiments illustrated in FIGS. 2 and 3, only one sealing surface is preferably designed in the form of membrane for the ambient pressure ATM, and this design increases safety and reduces an occurrence degree of failure.

Figure 4:
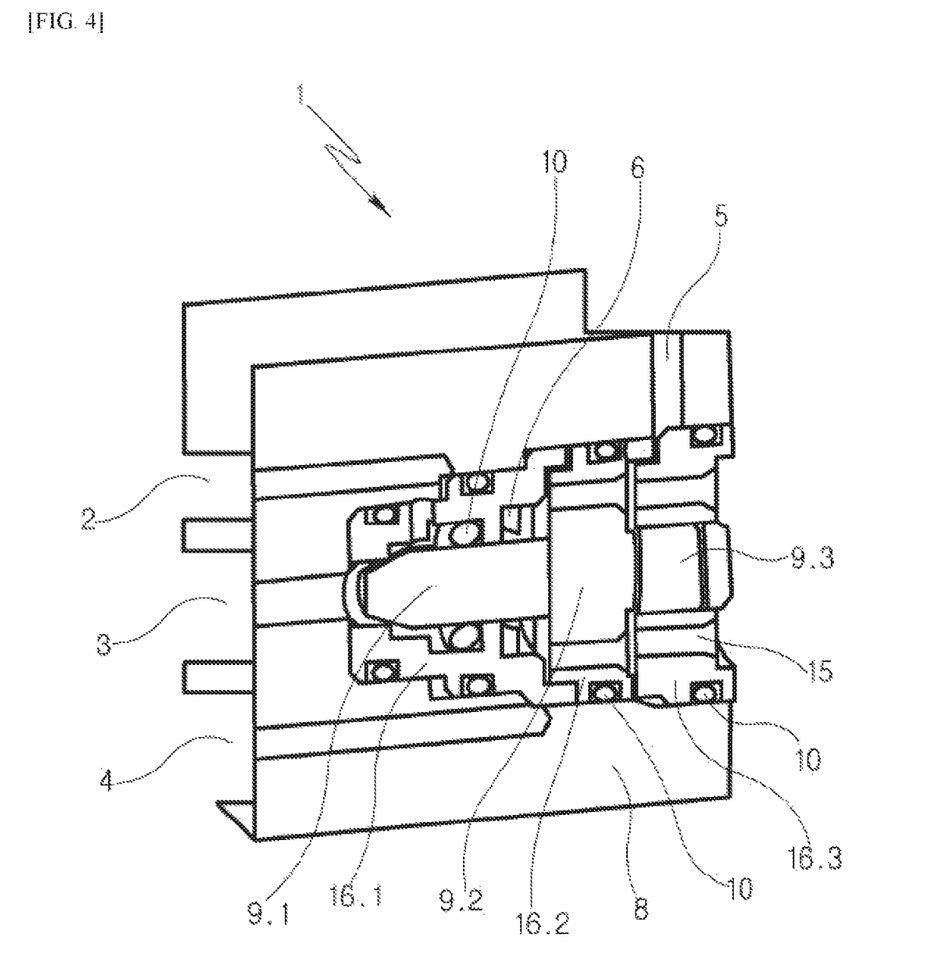
FIG. 4 is a cross-sectional view of a control flow control valve.

FIG. 4 is a cross-sectional view illustrating a control flow control valve 1. In the longitudinal cross-section indicated along the axis of a closure member, the present embodiment is characterized by three parts consisting of a closure member segment 9.1 having a seal seat, a closure member segment 9.2, and a closure member segment 9.3. The fitting position of the control flow control valve 1 is illustrated similar to those of FIGS. 1 and 3 within a pressure level, with the consequence that a control flow from a high-pressure fluid connection 3 and high pressure Pd to counter pressure Pb, i.e. a counter-pressure fluid connection, is regulated by the closure member segment 9.1 having the seal seat. The closure member segments 9.1, 9.2, and 9.3 are coupled to an interference-fit assembly, and are thus designed to be inexpensive and easy in assembly. In this case, the individual segments are continuously arranged without a connecting means. The closure member segment 9.2 and the closure member segment 9.3 are formed as membrane segments consisting of external membrane housings 16.2 and 16.3. The membrane housings 16.2 and 16.3 are connected to a central valve tappet (not shown in detail) by rubber 15 in a fluid-sealing manner. The housing part 16.1 surrounds the closure member segment 9.1 having the seal seat. A suction-pressure fluid connection 4 and an ambient-pressure fluid connection 5 compensate for the equilibrium of forces of the closure member acting on the valve seal seat of the closure member 9.1 by the effective areas of the closure members 9.2 and 9.3 assigned to the fluid connections. In the drawing, a spring 6 and a sealing ring 10 corresponding to the same are illustrated and typically designed.

Figure 5:
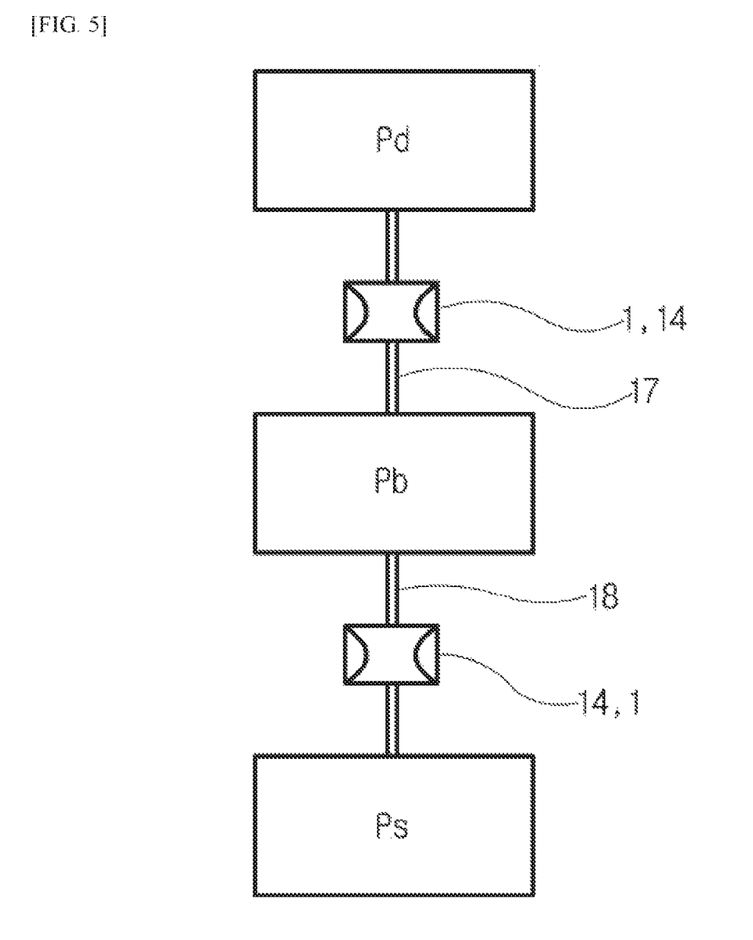
FIG. 5 is a basic circuit diagram of a control flow control valve assembly between pressure levels of a compressor.

FIG. 5 illustrates a fitting position of a control flow control valve 1, and a corresponding throttle 14 within high pressure, counter pressure, and suction pressure Pd, Pb, and Ps. A supply control line 17 is formed between the high-pressure level Pd and the counter-pressure level Pb. In a first modification example, a control flow as mass flow is regulated by the control flow control valve 1 at the position of the control flow control valve, and the corresponding throttle 14 is disposed in a discharge control line 18. This formation is proposed in detail in FIGS. 1, 3, and 4. Alternatively, the control flow control valve 1 may also be disposed in the discharge control line 18 and the associated throttle 14 may also be disposed in the supply control line 17 corresponding to the same. In this modification example, the flow path of the control flow from counter pressure to suction pressure is adjusted by the control flow control valve 1 as illustrated in FIG. 2.

DESCRIPTION OF REFERENCE NUMERALS

1: control flow control valve
2: counter-pressure fluid connection

3: high-pressure fluid connection
4: suction-pressure fluid connection
5: ambient-pressure fluid connection
6: spring member
7: scroll compressor
8: housing
9: closure member
9.1: closure member segment having seal seat
9.2: closure member segment
9.3: closure member segment
10: sealing ring
11: primary valve stem
12: secondary valve stem
13: lever mechanism
14: throttle, throttle complementary to other pressure level
15: rubber
16.1: housing part
16.2: membrane housing
16.3: membrane housing
17: supply control line
18: discharge control line
D20: seal seat diameter
D21: primary valve stem diameter
D22: effective diameter of Ps to ATM
D23: effective diameter of Pb to ATM
D24: effective diameter of Ps to Pb
D25: effective diameter of Pd to ATM
D26: secondary valve stem
L27: short lever
L28: long lever
Pd: high pressure
Pb: counter pressure, back pressure
Ps: suction pressure
ATM: ambient pressure
FO: spring force for constant offset

The invention claimed is:

1. A control flow control valve particularly for a scroll compressor in a vehicle air conditioner or heat pump, which comprises at least a housing, a closure member, and fluid connections for a control flow of counter pressure, high pressure and suction pressure, each of the fluid connections having an effective area of the closure member assigned thereto, the control flow control valve comprising:
a fluid connection for ambient pressure, the fluid connection having an effective area of the closure member additionally assigned thereto, wherein a force obtained from the pressures applied to the closure member acts on the closure member such that the control flow from the high pressure to the suction pressure is formed in a way to form a counter pressure, in which case the ambient pressure is formed in a fluid-sealing manner to other chambers having the high pressure, the counter pressure, and the suction pressure and acting on the closure member, wherein the closure member comprises a primary valve stem and a secondary valve stem, and the valve stems are interconnected through a lever mechanism.

2. A scroll compressor including a fixed scroll, an orbital scroll and a control flow control valve wherein the control flow control valve comprises at least a housing, a closure member, and fluid connections for a control flow of counter pressure in a pressure chamber behind the orbiting scroll to biasing the orbiting scroll toward the fixed scroll, high pressure and suction pressure, each of the fluid connections having an effective area of the closure member assigned thereto, the control flow control valve comprising:
a fluid connection for ambient pressure, the fluid connection having an effective area of the closure member additionally assigned thereto, wherein a force obtained from the pressures applied to the closure member acts on the closure member such that the control flow from the high pressure to the suction pressure is formed in a way to form the counter pressure, in which case the ambient pressure is formed in a fluid-sealing manner to other chambers having the high pressure, the counter pressure, and the suction pressure and acting on the closure member.

3. The scroll compressor according to claim 2, wherein a spring member is disposed on the closure member to generate an additional force.

4. The scroll compressor according to claim 3, wherein a spring force of the spring member is adjusted and designed such that the closure member is always open to a fixed pressure difference between the high pressure and the suction pressure to pass a fluid flow as the control flow therethrough at a position of the control flow control valve between the high pressure and the counter pressure, or the closure member is closed to a fixed pressure difference between the high pressure and the suction pressure to prevent the pass of a fluid flow as the control flow therethrough at a position of the control flow control valve between the counter pressure and the suction pressure.

5. The scroll compressor according to claim 2, wherein the closure member is formed in several parts by a plurality of closure member segments.

6. The scroll compressor according to claim 5, wherein the closure member consisting of the plurality of parts is designed as an interference-fit assembly, in which case the closure member segments of the closure member are interconnected only by forces acting on the closure member segments without an additional connecting means.

7. The scroll compressor according to claim 2, wherein the closure member has a cylindrical stepped shape, and is formed in three parts by three closure member segments.

8. The scroll compressor according to claim 2, wherein the closure member has a stroke of maximum 0.2 mm.

9. The scroll compressor according to claim 2, wherein a stopper for stroke of the closure member, as a maximum stroke limitation device, is formed in the housing or is formed in the scroll compressor by a fitting position of the control flow control valve.

10. The scroll compressor according to claim 2, wherein the ambient-pressure fluid connection is formed as a recess in the housing and is designed to be protected from water by a membrane for preventing the pass of water therethrough.

11. The scroll compressor according to claim 2, wherein the ambient-pressure fluid connection is formed as a membrane in a manner that it is formed integrally with an internal surface of the housing.

12. The scroll compressor according to claim 2, wherein the control flow control valve is formed integrally with the scroll compressor.

13. The scroll compressor according to claim 12, wherein the control flow control valve is positioned in a supply or discharge control line for a counter-pressure chamber, in which case the control flow control valve is disposed in the supply control line between the high pressure and the counter pressure or is disposed in the discharge control line between the counter pressure and the suction pressure.

14. A scroll compressor comprising a control flow control valve which comprises at least a housing, a closure member, and fluid connections for a control flow of counter pressure, high pressure and suction pressure, each of the fluid connections having an effective area of the closure member assigned thereto, the control flow control valve comprising:
  a fluid connection for ambient pressure, the fluid connection having an effective area of the closure member additionally assigned thereto, wherein a force obtained from the pressures applied to the closure member acts on the closure member such that the control flow from the high pressure to the suction pressure is formed in a way to form a counter pressure, in which case the ambient pressure is formed in a fluid-sealing manner to other chambers having the high pressure, the counter pressure, and the suction pressure and acting on the closure member,
  wherein the control flow control valve is formed integrally with the scroll compressor,
  wherein the control flow control valve is positioned in a supply or discharge control line for a counter-pressure chamber, in which case the control flow control valve is disposed in the supply control line between the high pressure and the counter pressure or is disposed in the discharge control line between the counter pressure and the suction pressure, and
  wherein a throttle is disposed in the discharge control line in a complementary manner when the control flow control valve is disposed in the supply control line, whereas the throttle is disposed in the supply control line when the control flow control valve is disposed in the discharge control line.

* * * * *